US012651680B2

(12) United States Patent
Gong et al.

(10) Patent No.: US 12,651,680 B2
(45) Date of Patent: Jun. 9, 2026

(54) CABLE

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Yu Gong, Huaian (CN); Xiao-Fei Liu, Huaian (CN); A-Nan Yang, Huaian (CN); Han-Run Xie, Huaian (CN); Lu-Yu Chang, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 107 days.

(21) Appl. No.: 18/396,664

(22) Filed: Dec. 26, 2023

(65) Prior Publication Data

US 2024/0221973 A1 Jul. 4, 2024

(30) Foreign Application Priority Data

Dec. 31, 2022 (CN) ........................ 202211739841.5

(51) Int. Cl.
*H01B 11/04* (2006.01)
*H01B 7/18* (2006.01)

(52) U.S. Cl.
CPC ......... *H01B 7/1895* (2013.01); *H01B 7/1875* (2013.01)

(58) Field of Classification Search
CPC ................................ H01B 11/04; H01B 11/06
USPC ....................................................... 174/113 R
See application file for complete search history.

(56) References Cited

U.S. PATENT DOCUMENTS 4,657,342 A 4/1987 Bauer
6,297,454 B1 10/2001 Gareis
6,365,836 B1 * 4/2002 Blouin .................. H01B 11/04 174/113 C
6,441,308 B1 * 8/2002 Gagnon ................ H01B 7/295 174/105 R
7,196,271 B2 3/2007 Cornibert et al.
8,071,880 B2 12/2011 Groegl et al.
8,559,778 B2 * 10/2013 Hurley ................ G02B 6/4407 385/110
8,729,394 B2 5/2014 Clark et al.
(Continued)

FOREIGN PATENT DOCUMENTS

CN 114743725 A 7/2022
CN 217485131 U 9/2022

*Primary Examiner* — Chau N Nguyen
(74) *Attorney, Agent, or Firm* — Ming Chieh Chang

(57) ABSTRACT

A cable includes: plural wire groups; a first insulating layer covering the plurality of wire groups; a first shielding layer covering the first insulating layer; a second shielding layer covering the first shielding layer; an outer insulating layer covering the second shielding layer; and an inner support member disposed inside the first insulating layer; wherein the inner support member includes a plurality of grooves with equal cross-sectional areas, one side of each wire group is disposed in the groove and in close contact with the inner support member, the other side of each wire group is in close contact with the first insulating layer to fix the position of each wire group, and the inner support member is made of silicone.

7 Claims, 4 Drawing Sheets

(56) References Cited

U.S. PATENT DOCUMENTS

| | | | | |
|---|---|---|---|---|
| 9,269,476 | B2 * | 2/2016 | Camp, II ............... | H01B 11/04 |
| 9,991,030 | B2 | 6/2018 | Wehrli et al. | |
| 10,031,301 | B2 * | 7/2018 | Glew ..................... | H01B 7/295 |
| 10,032,542 | B2 | 7/2018 | Glew et al. | |
| 10,290,392 | B2 | 5/2019 | Green et al. | |
| 10,438,726 | B1 | 10/2019 | Cook et al. | |
| 2003/0121695 | A1 * | 7/2003 | Wiebelhaus ........... | H01B 11/04 174/116 |
| 2004/0055781 | A1 * | 3/2004 | Cornibert ............... | H01B 11/06 174/135 |
| 2015/0221418 | A1 * | 8/2015 | Sumi ...................... | H01B 11/08 174/34 |
| 2016/0020002 | A1 * | 1/2016 | Feng ...................... | H01B 11/20 174/103 |

* cited by examiner

CABLE

BACKGROUND OF THE INVENTION

Field of the Invention

The present invention relates to a cable, and more particularly to a cable used to transmit high-frequency signals.

Description of Related Arts

U.S. Pat. No. 6,365,836, issued on Apr. 2, 2002, discloses a cable that includes a plurality of twisted pairs of insulated conductors, a generally cross-shaped core having arms with flanged ends extending sufficiently far around each twisted pair of insulated conductors to retain each twisted pair of insulated conductors in stable positions apart from each other, and a jacket generally surrounding the plurality of twisted pairs of insulated conductors and the core and held at a substantially constant distance away from each twisted pair of insulated conductors by the arms of the cross-shaped core.

SUMMARY OF THE INVENTION

A main object of the present invention is to provide an improved cable with a stable structure, reduced twisting and extrusion of the cable, improved roundness of the cable, and good SI performance of the cable.

To achieve the above-mentioned object, a cable comprises: a plurality of wire groups; a first insulating layer covering the plurality of wire groups; a first shielding layer covering the first insulating layer; a second shielding layer covering the first shielding layer; an outer insulating layer covering the second shielding layer; and an inner support member is provided inside the first insulating layer; wherein the inner support member includes a plurality of grooves with equal cross-sectional areas, one side of each wire group is disposed in the groove and in close contact with the inner support member, the other side of each wire group is in close contact with the first insulating layer to fix the position of each wire group, and the inner support member being made of silicone.

Compared to prior art, through the design of the inner support member of the cable, the present invention makes the cable structure stable and reduces the twisting and extrusion of the cable, so that the SI performance of the cable is good. The roundness of the cable has also been improved.

DETAILED DESCRIPTION OF THE DRAWINGS

Figure 1:
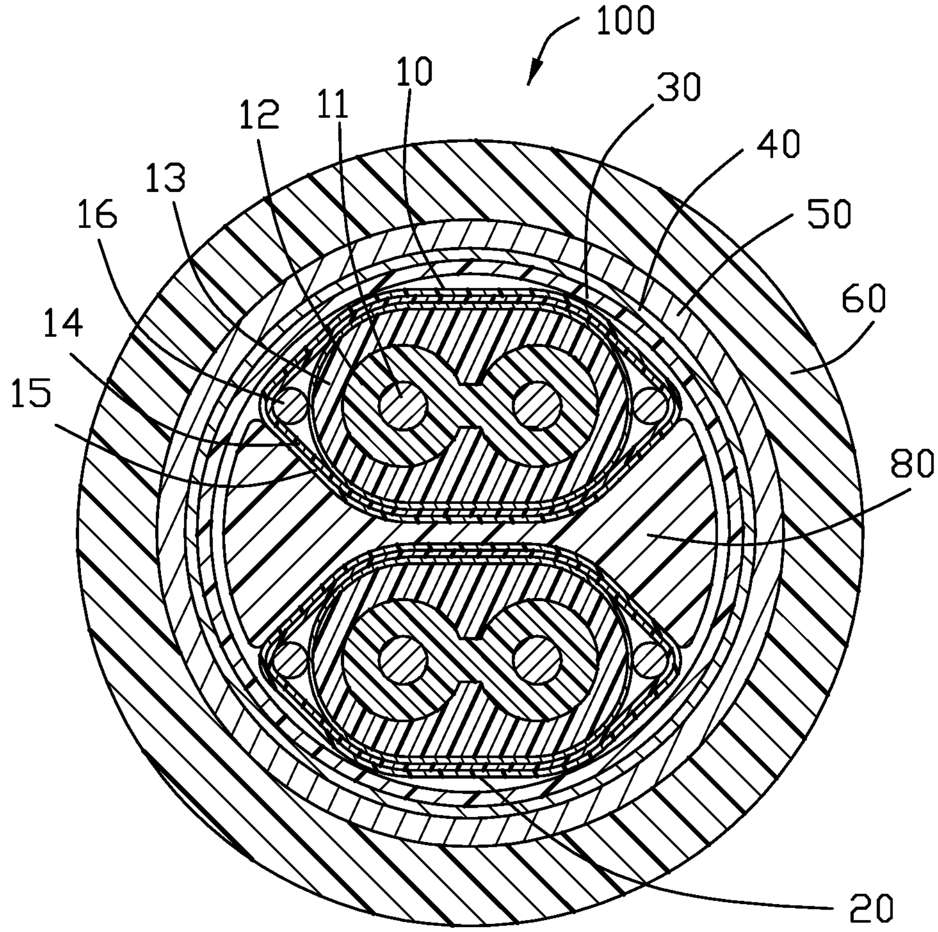
FIG. 1 is a cross-sectional view of the first embodiment of the present invention.
Figure 2:
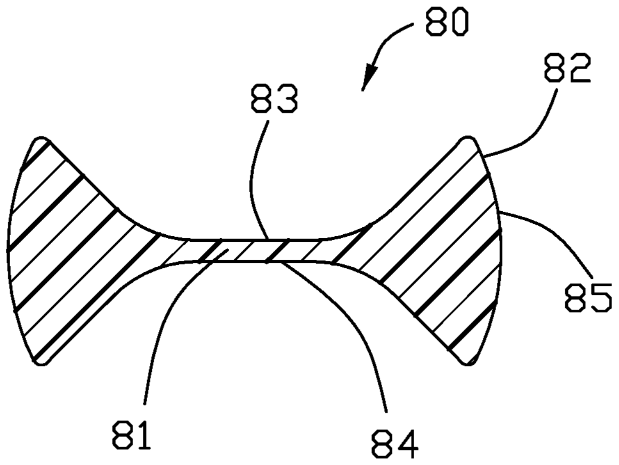
FIG. 2 is a cross-sectional view of the inner support member of the cable shown in FIG. 1.

Referring to FIGS. 1-2, it shows the first embodiment of the cable 100 of the present invention. The cable 100 includes a first wire group 10 and a second wire group 20, a first insulating layer 30 spiral wrapped around the first wire group 10 and the second wire group 20, a first shielding layer 40 spiral wrapped around the first insulating layer 30, a second shielding layer 50 covering the first shielding layer 40, and an outer insulating layer 60 covering the second shielding layer 50. The second shielding layer 50 is a braided shielding layer. The outer insulating layer 60 is extruded and wrapped around the second shielding layer 50 to form a stable structure. A gap between the first wire group 10 and the second wire group 20 and the first insulating layer 30. The cable 100 also includes an inner support member 80 that supports the cable and fills the gap.

Specifically, the first wire group 10 and the second wire group 20 are stacked up and down. The inner support member 80 includes an elongated middle portion 81 and two fan-shaped supporting portions 82 extending from both sides of the elongated middle portion 81, both two fan-shaped supporting portions 82 can abut against the first insulating layer 30. The elongated middle portion 81 and the two fan-shaped supporting portions 82 form an upper concave surface 83 and a lower concave surface 84. The first wire group 10 is positioned between the upper concave surface 83 and the first insulation layer 30. The upper side of the first wire group 10 is in close contact with the first insulation layer 30, and the lower side of the first wire group 10 is in close contact with the upper concave surface 83. The second wire group 20 is positioned between the lower concave surface 84 and the first insulation layer 30. The upper side of the second wire group 20 is in close contact with the first insulation layer 30, and the lower side of the second wire group 20 is in close contact with the upper concave surface 84. The fan-shaped supporting portion 82 includes a contact surface 85 that can directly contact the first insulation layer 30. The wire groups inside the cable 100 can be positioned through the inner support member 80, the internal structure of the cable is stable, and the cooperation between the fan-shaped supporting portion on both sides and the wire groups can well support the shape of the cable and improve the roundness of the cable. The cable does not need to be twisted and shaped, which reduces the twisting and extrusion of the cable and avoids the adverse impact on SI performance caused by twisting between pairs of wires. It is worth noting that the material of the inner support member 80 needs to be high temperature resistant, soft, highly elastic and ductile, has a long service life, and is not easy to age. In this embodiment, the material of the inner support member is silicone.

The first wire group 10 and the second wire group 20 have the same structure. The first wire group 10 includes two inner conductors 11, a spectacle-shaped inner insulating layer 12 co-extruded from the two inner conductors 11, a sheath layer 13 covering the inner insulating layer 12, a shielding layer 14 covering the sheath layer 13, and an outer coating layer 15 covering the shielding layer 14. Two ground wires 16 are between the sheath layer 13 and the shielding layer 14, and are respectively located on both sides of the two inner conductors 11 and on an extension line connecting the center points of the two inner conductors.

Figure 3:
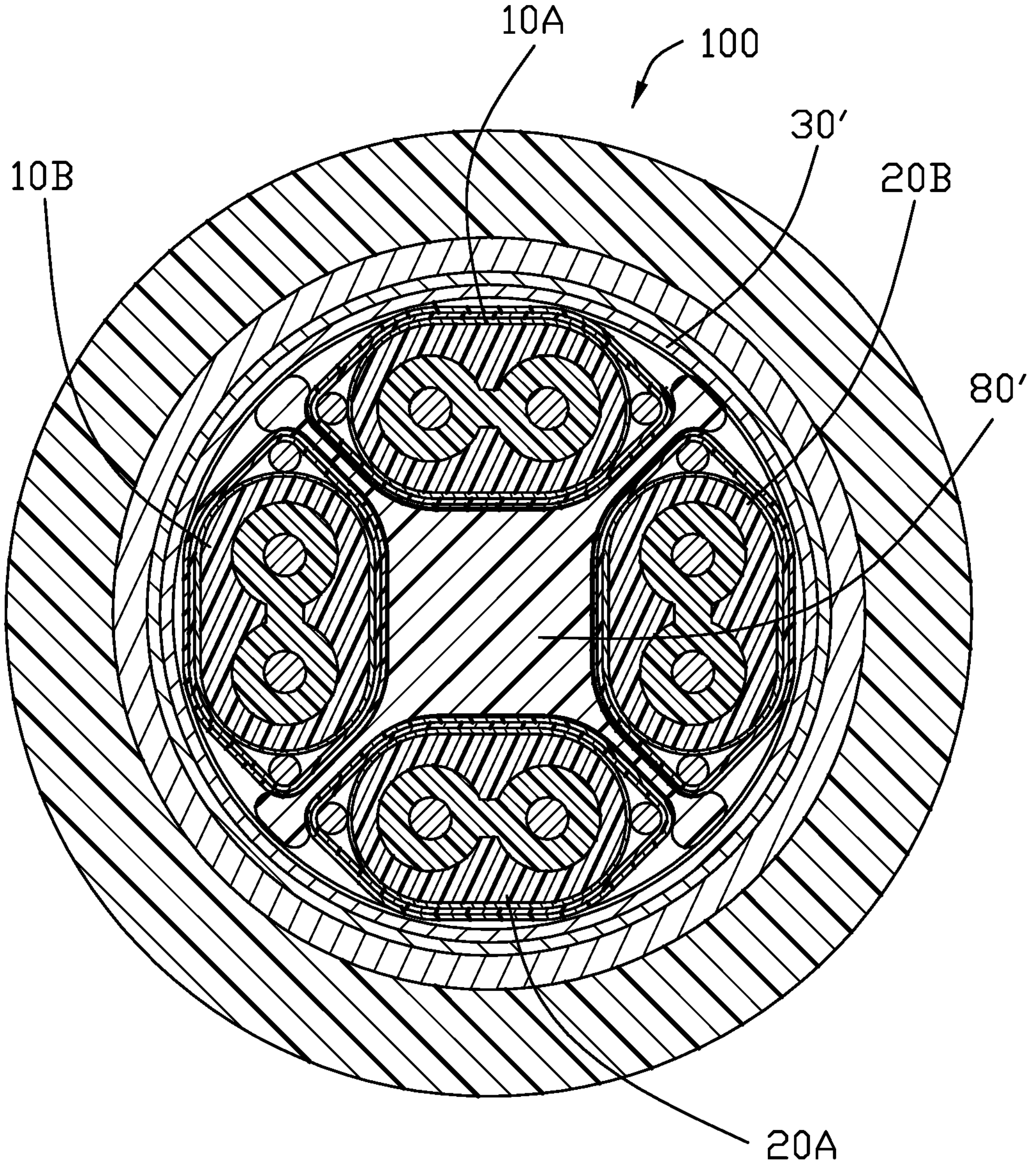
FIG. 3 is a cross-sectional view of the second embodiment of the present invention.
Figure 4:
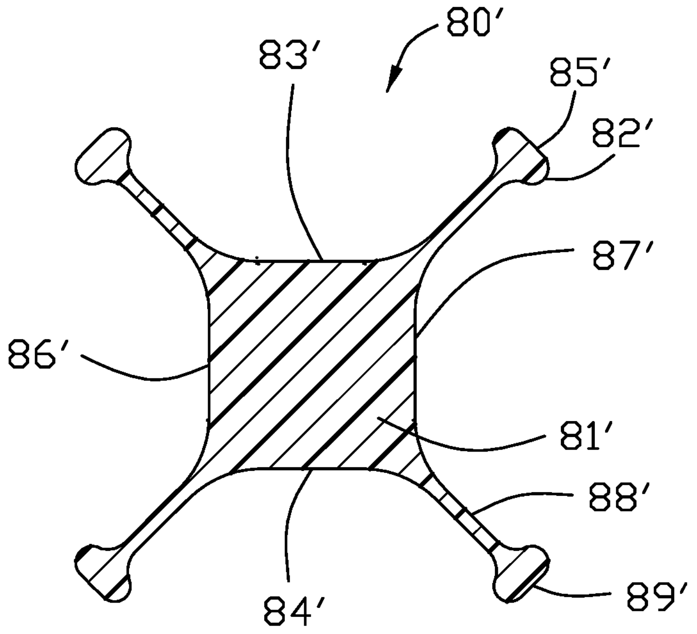
FIG. 4 is a cross-sectional view of the inner support member of the cable shown in FIG. 3.

Referring to FIGS. 3-4, it shows the second embodiment of the cable 100 of the present invention. In this embodiment, the cable 100 includes a first wire group 10A and a second wire group 20A aligned up and down, and a third wire group 10B and a fourth wire group 20B aligned left and right on both sides of the first wire group 10A and the second wire group 20A. The inner support member 80' includes a middle portion 81' disposed in the middle of the cable 100 and having a substantially square cross-section, four supporting portions 82' respectively extend from the four corners of the middle portion 81' toward the first insulating layer 30' and abut against the first insulating layer 30'. The middle portion 81' and the four supporting portions 82' respectively form an upper concave surface 83', a lower concave surface 84', a left concave surface 86', and a right concave surface 87' in the upper, lower, left and right directions. The supporting portion 82' includes an elongated transition portion 88 extending from four corners of the middle portion 81' toward the first insulating layer 30' and an abutment portion 89' connected to the elongated transition portion 88' and directly abutting on the first insulating layer 30'. The width of the abutment portion 89' is greater than the width of the elongated transition portion 88'. The two ends of the abutment portion 89' that are perpendicular to the extension direction of the elongated transition portion 88' are symmetrically arranged with the center line of the extension direction of the elongated transition portion 88' as the axis, and the two ends of the abutment portion 89' are respectively in contact with the two adjacent wire groups. The first wire group 10A is positioned between the upper concave surface 83' and the first insulating layer 30'. The one side of the first wire group 10A is in close contact with the first insulation layer 30', and the other side of the first wire group 10A is in close contact with the upper concave surface 83'. The second wire group 20A is positioned between the lower concave surface 84' and the first insulating layer 30'. The one side of the second wire group 20A is in close contact with the first insulation layer 30', and the other side of the second wire group 20A is in close contact with the lower concave surface 84'. The third wire group 10B is positioned between the left concave surface 86' and the first insulating layer 30'. The one side of the third wire group 10B is in close contact with the first insulation layer 30', and the other side of the third wire group 10B is in close contact with the left concave surface 86'. The fourth wire group 20B is positioned between the right concave surface 87' and the first insulating layer 30'. The one side of the fourth wire group 20B is in close contact with the first insulation layer 30', and the other side of the fourth wire group 20B is in close contact with the right concave surface 87'. The abutment portion 89' includes a contact surface 85' that is in direct contact with the first insulating layer 30'. The inner support member 80' forms a compact structure in contact with the four wire groups and the first insulation layer 30'.

In the second embodiment, the structure of the first wire group 10A, the second wire group 20A, the third wire group 10B, and the fourth wire group 20B are the same as the first wire group 10 and the second wire group 20 in the first embodiment. And the multi-layer wrapping structure outside the four wire groups and the inner support member is also the same as that in the first embodiment.

The invention claimed is:

1. A cable comprising:

a plurality of wire groups each including a pair of inner conductors and an outer coating layer enclosing the pair of inner conductors;

a first insulating layer covering the plurality of wire groups;

a first shielding layer covering the first insulating layer;

a second shielding layer covering the first shielding layer;

an outer insulating layer covering the second shielding layer; and an inner support member disposed inside the first insulating layer; wherein the inner support member includes a plurality of grooves with equal cross-sectional areas, one side of each wire group is disposed in a corresponding one of the plurality of grooves and in close contact with the inner support member, the other side of each wire group is in close contact with the first insulating layer to fix each wire group, and the inner support member is made of silicone; and the inner support member includes a middle portion disposed in a middle of the plurality of wire groups, at least two supporting portions in contact with the outer coating layers of the plurality of wire groups, and at least two concave surfaces formed between the supporting portions for limiting the plurality of wire groups.

2. The cable as claimed in claim 1, wherein the middle portion is elongated and the at least two supporting portions are fan-shaped and extend outward from both sides of the elongated middle portion to abut the first insulating layer, and the at least two concave surfaces are formed by the elongated middle portion and the at least two fan-shaped supporting portions and include an upper concave surface for limiting the first wire group and a lower concave surface for limiting the second wire group.

3. The cable as claimed in claim 1, wherein the plurality of wire groups includes a first wire group and a second wire group aligned up and down, and a third wire group and a fourth wire group aligned left and right on both sides of the first wire group and the second wire group.

4. The cable as claimed in claim 3, wherein the middle portion has a square cross-section and the at least two supporting portions include four supporting portions respectively extending from four corners of the middle portion toward the first insulating layer and abutting against the first insulating layer, and the at least two concave surfaces are formed by the middle portion and the four supporting portions respectively and include four concave surfaces in the upper, lower, left, and right directions for limiting the first wire group, the second wire group, the third wire group, and the fourth wire group.

5. The cable as claimed in claim 4, wherein each of the four supporting portions includes an elongated transition portion extending outwardly from four corners of the middle portion respectively and an abutment portion connected to the elongated transition portion and directly abutting against the first insulating layer, and a width of the abutment portion is greater than a width of the elongated transition portion.

6. The cable as claimed in claim 5, wherein two ends of the abutment portion perpendicular to the extension direction of the elongated transition portion are symmetrically arranged with respect to the center line of an extension direction of the elongated transition portion, and the two ends of the abutment portion are respectively in contact with two adjacent wire groups of the plurality of wire groups.

7. The cable as claimed in claim 1, wherein the second shielding layer is a braided shielding layer, and the outer insulating layer is extruded and molded to cover the second shielding layer.

* * * * *